United States Patent [19]

Ishibashi et al.

[11] 3,875,586

[45] Apr. 1, 1975

[54] COLOR TELEVISION CAMERA

[75] Inventors: Shizuka Ishibashi; Yoshizumi Eto, both of Hachioji, Japan

[73] Assignees: Hitachi, Ltd.; Hitachi Electronics Co., Ltd., both of Tokyo, Japan

[22] Filed: May 29, 1973

[21] Appl. No.: 364,426

[30] Foreign Application Priority Data

May 29, 1972 Japan ................................ 47-52512

[52] U.S. Cl. .................................. 358/44, 313/382

[51] Int. Cl. ............................................ H04n 9/06

[58] Field of Search ..... 178/5.4 ST, DIG. 29, 5.4 R, 178/7.2, 7.5 D, 6.8, 5.2 D, 5.2 A, 5.2 R, 6.7 A; 315/18, 19, 21 R, 21 C, 22, 25, 27 GD, 31 TV; 313/365, 371, 382; 358/44, 43, 47, 48

[56] References Cited

UNITED STATES PATENTS 2,304,163 12/1942 Goldsmith ............................ 178/7.5

2,901,531 8/1959 McCoy et al. ....................... 178/5.4

*Primary Examiner*—Robert L. Griffin

*Assistant Examiner*—R. John Godfrey

*Attorney, Agent, or Firm*—Craig & Antonelli

[57] ABSTRACT

In a single pickup tube color camera using a tri-color stripe filter, the current flowing through the focusing coil is so determined that the resolution may be about 300 lines, thus the effective diameter of the electron beam being increased with the current density of the beam decreased.

8 Claims, 11 Drawing Figures

COLOR TELEVISION CAMERA

BACKGROUND OF THE INVENTION

1. Field of the Invention

The present invention relates to an improvement on a single pickup tube color camera.

2. Description of the Prior Art

It is first necessary in obtaining a color television signal from an object to derive signal components corresponding to three primary colors from the light coming from the object. The three pickup tube camera is most widely used in the field of color television, as an image pickup device. The three pickup tube camera uses three pickup tubes each of which converts the corresponding one of three primary color images of the object into a TV signal. The three pickup tube camera can, indeed, produce pictures of high quality, but it is expensive, large in size and heavy in weight so that the maintenance thereof is difficult. Therefore, for industrial or domestic use there is a need for a single pickup tube camera (hereafter referred to for brevity as SPT camera) which is free from the above said weaknesses.

An SPT camera itself is already well known and one example of the various conventional SPT cameras is a camera in which a tri-color stripe filter is used. However, the pickup tube of such an SPT camera has stray capacitance between the signal electrodes and therefore cross-talk of the video signals corresponding to the three primary colors will occur. This is one of the drawbacks of the conventional SPT camera.

The prior art method of eliminating such a drawback is to make the frequencies or phases of the three primary color signals different from one another so as to facilitate the separation thereof. However, in this method, even in the case where the phases of the signals are made different, the phase of each signal fluctuates with the intensity of the incident light so that satisfactory separation of the signals cannot be expected.

SUMMARY OF THE INVENTION

It is, therefore, one object of the present invention to provide a color camera capable of providing a TV signal in which the phases of the primary color signal components remain constant even when the intensity of the incident light varies and in which the erroneous mixing of colors is prevented.

A second object of the present invention is to eliminate a beat component generated through the interference between the power source frequency and the frequency of a signal produced by the electron beam hitting the signal electrodes.

A third object of the present invention is to obtain a color TV signal in which the white balance is excellent.

A fourth object of the present invention is to provide a color camera having a simple structure, which has no color encoder and in which a NTSC signal or a PAL signal can be derived directly from the image pickup tube incorporated.

According to the present invention which has been made to attain the above mentioned objects, the effective diameter of the electron beam to scan the photoconductive layer and the density of the current carried by the electron beam are so controlled as not to deteriorate the resolution of the video signal, and also the level of the D.C. component and the amplitude and phase of the A.C. component applied to each signal electrode are appropriately controlled.

BRIEF DESCRIPTION OF THE DRAWING

Now, the present invention will be described by way of examples as compared with the conventional color cameras and the same reference numeral and characters are applied to like parts or elements throughout the attached drawings.

DESCRIPTION OF THE PREFERRED EMBODIMENTS

Figure 1:
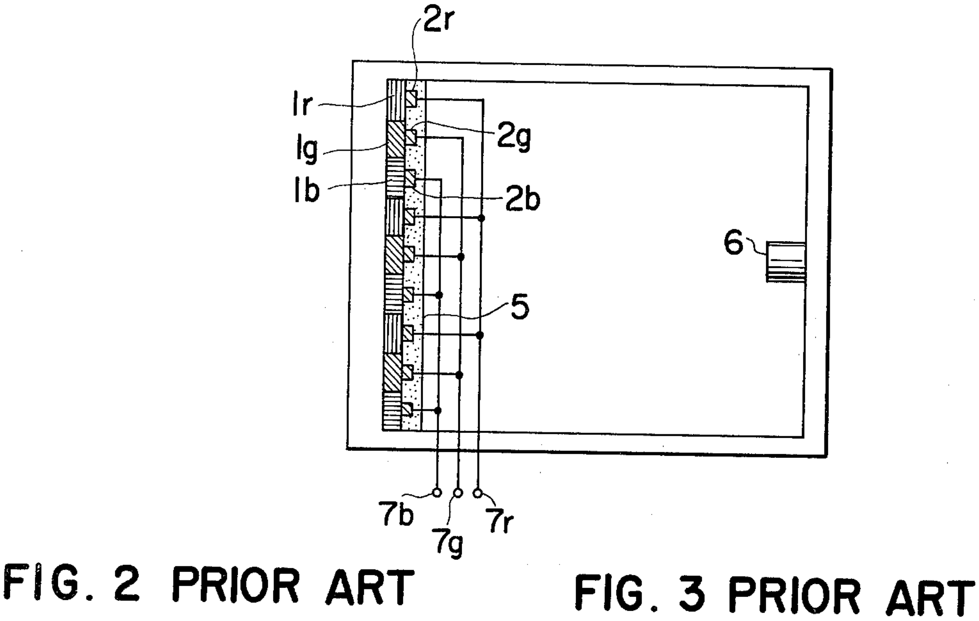
FIG. 1 PRIOR ART
FIG. 1 shows in cross section a conventional image pickup tube.

FIG. 1 shows the structure of a conventional signal pickup tube color camera using a tri-color stripe filter and in the figure the beam control system such as the deflecting coils, focusing coil and the current source to supply current for these coils is omitted. The tricolor stripe filter used in the image pickup tube comprises a plurality of filter elements; i.e., red, green and blue filter elements 1*r*, 1*g* and 1*b*, each having the shape of a stripe. The image pickup tube has a plurality of separate transparent signal electrodes 2*r*, 2*g* and 2*b* attached respectively on the red, green and blue filter elements 1*r*, 1*g* and 1*b*. The signal electrodes 2*r*, 2*g* and 2*b* are connected respectively with signal terminals 7*r*, 7*g* and 7*b*, the electrodes corresponding to the like filter elements being commonly connected.

Figure 2:
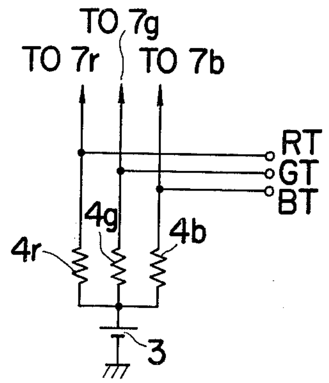
FIG. 2 PRIOR ART
FIGS. 2 and 3 show the circuit configurations of conventional signal reading sections.

Signal output terminals RT, GT and BT are connected with a D.C. source 3 respectively through load resistors 4*r*, 4*g* and 4*b*, as shown in FIG. 2. Accordingly, when the photoconductive layer 5 is scanned by the electron beam from the gun 6, the video signals R, G and B corresponding to the three primary color component images of the object can be derived respectively from the signal output terminals RT, GT and BT.

With this structure however, stray capacitances exist between the signal electrodes and the capacitances give rise to crosstalk between the red, green and blue video signals. Thus, it is quite difficult in practice to derive completely separate red, green and blue video signals from the corresponding signal output terminal.

Figure 3:
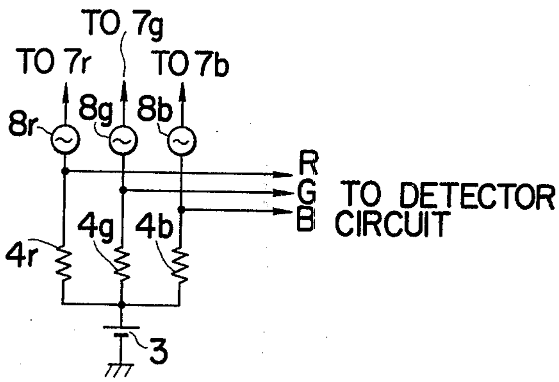
FIG. 3 PRIOR ART

An example of the method for eliminating such crosstalk phenomena is disclosed in the U.S. Pat. Nos. 2,789,157 and 2,901,531 as disclosed in the prior art, in addition to a D.C. source 3 and load resistors 4*r*, 4*g* and 4*b* as seen in FIG. 2, A.C. sources 8*r*, 8*g* and 8*b* are connected respectively with the signal terminals 7*r*, 7*g* and 7*b*, as shown in FIG. 3. The A.C. sources may supply A.C. voltages or currents whose frequencies are respectively $\omega r$, $\omega g$ and $\omega b$, where $\omega r$, $\omega g$ and $\omega b$ are different from one another, or they may supply A.C. voltages or currents having the same frequency but phases different by 120° from one another.

With this circuit arrangement, the respective video signals can be easily separated even if there is crosstalk among the signals, since the frequencies or phases of the signals are different from one another. In the first case where the frequencies of the source voltages or currents are all different, the outputs from the signal electrodes are passed through bandpass filters having center frequencies of $\omega r$, $\omega g$ and $\omega b$ and the red, green and blue video signals can be derived by envelope-detecting the respective outputs of the filters. On the other hand, in the second case where the frequencies of the source voltages or currents are the same but the phases thereof are different by 120° from one another, the outputs from the signal electrodes are fed to synchronous detectors and the red, green and blue video signals R, G and B can be derived by synchronously detecting the outputs with the reference signals having phases of 0°, 120° and 240°, respectively.

In the operation, however, of the image pickup tube according to the method as in the above second case, the phases of the signals derived from the signal output terminals RT, GT and BT varies with the intensity of the incident light, as described later, and the complete separation of the signals R, G and B from one another will be impossible even if the synchronous detection with the reference phases of 0°, 120° and 240° is performed. Moreover, the video signals are often disturbed by the beat component created through the interference between the frequency of the A.C. source and the periodic signal produced by the electron beam scanning perpendicularly the signal electrodes. These problems, which are described in further details later, are not mentioned in the above said U.S. Patent specifications.

Further, in most cases the NTSC or PAL signal is used in place of the signals R, G and B for the color television system which signal is made up of a multiplex conbination of the signals R, G and B. In case, therefore, where the circuit shown in FIG. 3 is connected with the image pickup tube shown in FIG. 1, the derived signals R, G and B must first be passed through an encoder of the NTSC or PAL system to convert the signals into a NTSC or PAL signal. Such an encoder, however, has a very complicated structure.

The single pickup tube or SPT color camera which has been fabricated according to the present invention to eliminate the above described drawbacks, has the same structure as shown in FIG. 1 and employs the same circuit as shown in FIG. 3.

In order to facilitate the understanding of the present invention, the property of each signal derived from the SPT color camera is first explained on the assumption that the camera tube is provided with only a single signal electrode (actually there are a plurality of such electrodes). A voltage $E_T$ is applied to the single signal electrode, such that $$E_T = E_O + \Delta E \cos \omega t \quad \ldots\ldots \quad (1),$$

where $E_O$ is a D.C. component and $\Delta E$ and $\omega$ are respectively the amplitude and the angular frequency of an A.C. component.

Then, let it be assumed that the potential at that surface of the photoconductive layer which is hit by the electron beam is $E_C$, then the potential $E_C$ of the surface before the incidence of the beam contains the same A.C. component as the voltage $E_T$. Therefore, the D.C. component of the potential $E_C$ is given by the expression $$\Delta\phi - \Delta E$$

where $\Delta\phi$ is described later, and the potential $E_C$ can be expressed by the formula $$E_C = \Delta\phi - \Delta E + \Delta E \cos \omega t \quad \ldots\ldots \quad (2)$$

Figure 4:
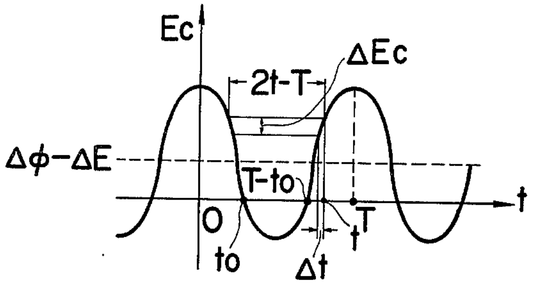
FIG. 4 illustrates the waveform of a voltage developed across the photoconductive layer.

The variation in the potential $E_C$ with time $t$ is as shown in FIG. 4.

Figure 5:
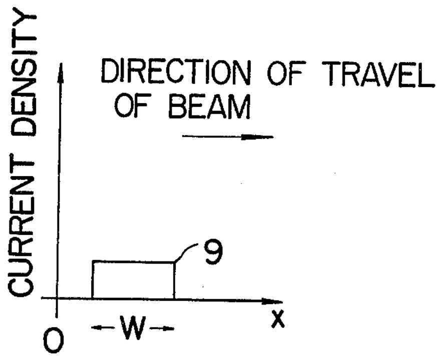
FIGS. 5 and 8 show the distributions of the densities of currents carried by the electron beam.

Since the equation $$x = vt \quad \ldots\ldots \quad (3)$$

holds, where $v$ is the speed of beam scanning and $x$ is the position of the beam spot on the photoconductive layer, FIG. 4 with the scale of time on the abscissa multipled by a factor $v$ can be considered to give the potential of that position $x$ on the photoconductive layer which is hit by the electron beam. If the distribution of current density in the cross sectional area perpendicular to the path of the beam is of a constant value along the diameter $D$ of the beam as shown in FIG. 5 and if the current density is large enough to read the quantity of the electric charges stored in the photoconductive layer, then current $i_{S1}$ large enough to reduce the potential $E_C$ to zero will flow as soon as the leading edge 9 of the electron beam has touched the non-scanned portion of the photoconductive layer, since the potential $E_C$ is positive when $0 \leqq t \leqq t_0$ and $T - T_0 \leqq t \leqq T$. Here, the current $i_{S1}$ is such that $$\begin{aligned} i_{S1} &= \frac{1}{\Delta t}(E_C \cdot v\,\Delta t) \\ &= vE_C \\ &= v\,(\Delta\Phi - \Delta E + \Delta E \cos \omega t) \end{aligned} \quad \ldots (4)$$

If, in this case, the diameter $D$ of the beam is sufficiently small, only the current $i_{S1}$ will flow. Accordingly, the potential at the surface, hit by the beam, of a portion of the photoconductive layer into which the signal current $i_{S1}$ flows, is reduced to zero while the potential at the remaining surface is not zero. Therefore, the density of the charges in the photoconductive layer becomes nonuniform, depending upon the position on the layer, by the time when the beam hits the layer next time, and the output signal adversely fluctuates.

On the other hand, if $D > vT$, then current $i_{S2}$ will flow for $t$ such that $T - T_O < t < T$ since that portion of the photoconductive layer which has already been scanned by the leading edge 9 of the electron beam is still scanned by the other portion of the beam. Here, the current $i_{S2}$ is such that $$\begin{aligned} i_{S2} &= \frac{1}{\Delta t}\left\{(2t - T)\cdot \Delta E_C\right\} \\ &= \frac{1}{\Delta t}\left\{(2t - T)(-\Delta E \omega \sin \omega T \cdot v \Delta t)\right\} \\ &= v \Delta E \omega (T - 2t) \sin \omega t \end{aligned} \quad (5),$$

where $T - t_O < t < T$.

Accordingly, the potential $E_C$ is zero everywhere on that surface of the photoconductive layer which is hit by the electron beam, after the scanning has been completed. And the voltage or potential difference between both the surfaces of the layer, one of which is hit by the beam and the other of which has a signal electrode disposed thereon, is $E_O + \Delta E$. Consequently, the above introduced quantity $\Delta\phi$ corresponds to the variation in the potential difference between both the surfaces of the photoconductive layer in response to the intensity of the incident light during the time $T_f$ of a frame. The quantity $\Delta\phi$ can be quantitatively approximated by the following expression:

$$\Delta\Phi = (E_0 + \Delta E)\left\{1 - \exp\left(-\frac{T_f}{CR_p}\right)\right\} \quad (6),$$

where $C$ and $R_p$ are respectively the capacitance and the resistance of the photoconductive layer per one picture element, $R_p$ varying with the intensity of the incident light.

Figure 6:
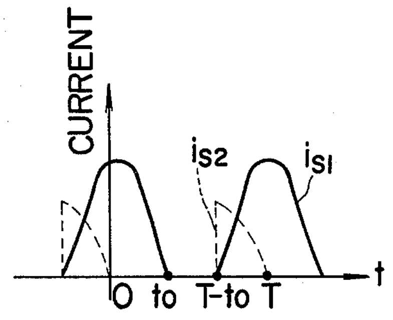
FIG. 6 illustrates the waveform of the signal current.

FIG. 6 shows the waveforms of the above mentioned currents $i_{S1}$ and $i_{S2}$. The mean values $\overline{i_{S1}}$ and $\overline{i_{S2}}$ of the currents $i_{S1}$ and $i_{S2}$ are given by the formulae:

$$\overline{i_{Si}} = \frac{2v}{T}\left\{(\Delta\Phi - \Delta E)\, t_0 + \frac{\Delta E}{\omega}\sin\omega t_0\right\} \quad (7)$$

and $$i_{S2} = v\left\{\Delta E + \frac{\Delta E}{T}(2t_0 - T)\cos\omega t_0 - \frac{2\Delta E}{T}\frac{\sin\omega t_0}{\omega}\right\} \quad (8)$$

and the mean of $\overline{i_{S1}} + \overline{i_{S2}}$ is such that $$i_{S1} + i_{S2} = v\Delta\phi \ \ldots\ldots\ldots\ldots\ldots \quad (9)$$

Moreover, the $\cos\omega t$ component and the $\sin\omega t$ component of $i_{S1}$ and $i_{S2}$, i.e., $(_{S1})_{cos}$, $(i_{S2})_{cos}$, $(i_{S1})_{sin}$ and $(i_{S2})_{sin}$, are as follows. Thus, $$(i_{S1})_{cos} = \frac{4v}{T}\left\{(\Delta\Phi - \Delta E)\frac{\sin\omega t_0}{\omega} + \frac{\Delta E}{T}\left(\frac{\sin 2\omega t_0}{2\omega} + t_0\right)\right\} \quad (10)$$

$$(i_{S2})_{cos} = \frac{v\Delta E}{T}\left\{\frac{T}{2} + \left(t_0 - \frac{T}{2}\right)\cos 2\omega t_0 - \frac{\sin\omega t_0}{2\omega}\right\} \quad (11)$$

$$(i_{S1})_{sin} = 0 \ \ldots\ldots\ldots\ldots\ldots\ldots \quad (12)$$

and $$(i_{S2})_{sin} = \frac{v\Delta E}{T}\left\{\omega t_0(t_0 - T) + \left(\frac{T}{2} - t_0\right)\sin 2\omega t_0 + \frac{1}{2\omega}(1 - \cos 2\omega t_0)\right\} \quad (13)$$

Consequently, for the values derived above, the amplitude $A$ of the $\omega$ component of $i_{S1} + i_{S2}$ and the phase lag $\Phi$ of the same component with respect to $\cos\omega t$ are given by the expression:

$$A = \sqrt{\left\{(i_{S1})_{cos} + (i_{S2})_{cos}\right\}^2 + \left\{(i_{S1})_{sin} + (i_{S2})_{sin}\right\}^2} \quad (14)$$

$$\Phi = \tan^{-1}\frac{(i_{S1})_{sin} + (i_{S2})_{sin}}{(i_{S1})_{cos} + (i_{S2})_{cos}} \quad (15)$$

Figure 7:
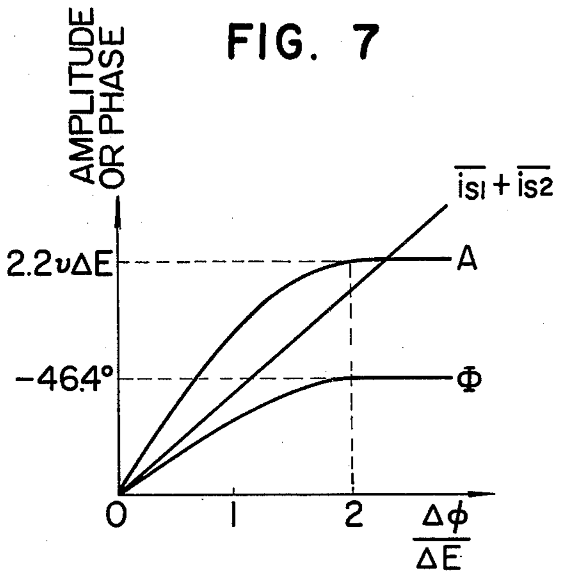
FIG. 7 depicts the relationship between the amplitude or phase of the signal current and the variation in the voltage across the photoconductive layer.

The mean $\overline{i_{S1}} + \overline{i_{S2}}$ in the formula (9) and the amplitude $A$ and the phase lag $\Phi$ in the formulae (14) and (15) are graphically shown in FIG. 7.

It is now concluded that the signal current $i_S$ derived from the SPT camera, comprising the D.C. and $\omega$ components, is given by the formula:

$$i_S = v\left\{\Delta\phi + A\cos(\omega t - \Phi)\right\} \ \ldots\ldots\ldots \quad (16)$$

The description hitherto made is applied to the case where there is only one signal electrode in the image pickup tube used in the camera. Now, however, the case will be described where there are three signal electrodes existing and three voltages $E_{Tr}$, $E_{Tg}$ and $E_{Tb}$ are respectively applied to the signal electrodes. It is here assumed that $$E_{Tj} = E_{Oj} + \Delta E_j \cos(\omega t + O_j) \ \ldots\ldots\ldots \quad (17)$$

where $j = r$, $g$ or $b$.

It is assumed that the variations in the potentials at the positions on the photoconductive layer corresponding to the three signal electrodes 2$r$, 2$g$ and 2$b$, for the period of a frame, is represented by $\Delta\phi_j$ and that the amplitudes and the phases of the $\omega$ components of the signals derived respectively from the above said positions on the photoconductive layer 5 are denoted respectively by $A_j$ and $\Phi_j$, where $j = r$, $g$ and $b$. In this case, the sum $I_S$ of the three signal currents derived from the three signal electrodes is such that if $\omega < |\omega' - \omega|$, then $$I_S = v\sum_{j=r,g,b}\left\{\Delta\phi_j + A_j\cos(\omega t + \theta_j + \Phi_j)\right\} \ \ldots\ldots \quad (18)$$

where $\omega'$ is the angular frequency at which the electron beam crosses the signal electrodes.

Here, $\theta_j$ is constant since it is the phase of an externally applied A.C. voltage while $\Phi_j$ varies with the intensity of the incident light, the maximum of the change being 46.4°, as shown in FIG. 7. Unless $\Phi_j$ is kept constant, the complete separation of the signals R, G and B is not possible even by synchronously detecting the current sum $I_S$ with respect to the reference phase $\theta_j$, as described in the above mentioned U.S. Patent specification. When the phase shift is as large as 46.4°, the undesirable color mixing becomes remarkable and the reproduced color picture is completely blurred.

In the foregoing analysis, the density of the current carried by the electron beam is assumed to be sufficiently large and to have a rectangular distribution, as shown in FIG. 5. However, when the density is reduced to less than a certain level, the quantity of charges in the photoconductive larger cannot be read any longer only by the leading edge 9 of the electron beam. Namely, the current $i_{S1}$ described above is carried by the electron beam having a width of $v\Delta T$ during an interval of $\Delta T$ after the leading edge 9 of the beam has touched the non-scanned portion of the photoconductive layer. This means that for the rectangular current density as shown in FIG. 5 the signal current $i_{S1}$ is changed approximately to a current $i_{S1}$ such that $$i'_{S1} \simeq \int_0^{\Delta T} i_{S1}(t - t')\, dt' \quad .... (19)$$

Accordingly, the phase of the $\omega$ component of the signal current $i_{S1}$ will lag by $\Delta\eta$ such that $$\Delta\eta \quad \frac{t'}{T}\pi \qquad (20)$$

Thus, even if the current density of the electron beam is decreased, the current $i_{S2}$ also follows nearly the same change as in the above case of $i_{S1}$ if the potential at that surface of the photo conductive surface which is hit by the beam, is turned to zero in an interval of $\Delta T$. Thus, the signal current $i_S$ given by the above formula (16) can be expressed by the following approximation formula:

$$i_S \cong v\left\{\Delta\phi + A\cos(\omega t - \Phi - \Delta\eta')\right\} \ldots (21),$$

where $\Delta\eta'$ is the phase lag of $i_S$ produced corresponding to the lag $\Delta\eta$ of $i_{S1}$. In this case, as seen in FIG. 7, $\Phi$ is negative and, as seen from the formula (20), $\Delta\eta$ is positive, so that the total variation $|\Phi + \Delta\eta'|$ of the phase is smaller than the variation $|\Phi|$ given by the formula (16), thus the degree of color separation is improved.

Figure 8:
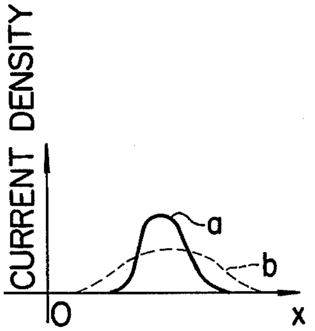

The actual distribution of the beam current density nearly coincides with the Gaussian distribution as shown in FIG. 8 rather than the rectangular one as shown in FIG. 5. If the electron beam is defocused to some extent, the distribution of the density of the beam current represented by the solid curve *a* in FIG. 8 will shift to another distribution as designated by the dotted curve *b* in FIG. 8. In this way, the density of the current carried by the electron beam can be easily decreased. Here, the phase lag $\Delta\eta$ for the Gaussian distribution does not assume a simple form as in the formula (20) but the lag $\Delta\eta$ remains positive so that the phase variation in the signal current $i_S$ is still improved.

The inventors have attained the following conclusion empirically. Namely, if the condition on the resolution is loosened, that is, if the beam is defocused from the ordinary resolution of about 500 TV lines to a resolution of about 300 lines, then the variation in the phase of the signal current $i_S$ for a frequency of 3.58 MHz is less than 5°. This amount of the phase variation will cause no appreciable mixing of colors and therefore raises no problem. If, therefore, the beam is defocused as described above, the signal current $I_S$ in the formula (18) may be approximated by the current $I_S'$ such that $$I_S' \simeq v \sum_{j=r,g,b} \left\{\Delta\phi_j + A_j \cos(\omega t + \theta_j)\right\} \quad .... (22)$$

In the foregoing consideration, the frequency $\omega'$ at which the beam crosses the signal electrodes is such that $|\omega' - \omega| > \omega$. Namely, the beat component produced through the interference between the frequency $\omega'$ and the frequency $\omega$ of the A.C. voltage to be applied to the signal electrodes, is outside the band in which the video signal lies. In general, however, $\omega'$ and $\omega$ are not so different from each other and the beat component will fall within the band. For example, $\omega$ may be 3 to 4 MHz. On the other hand, if the width of each signal electrode shown in FIG. 1 is chosen to be, for example, 20 $\mu$m, then a set of signal electrodes *r*, *g* and *b* covers 60 $\mu$m and if the width of scanning by the electron beam is 12 mm and the effective horizontal scanning period 50 $\mu$s, then the angular frequency $\omega'$ is a value corresponding to 4 MHz and nearly equal to $\omega$.

If the angular frequency $\omega$ is increased, the phase lag of the signal current is not negligible due to the signal electrodes having certain finite resistance and interelectrode capacitances. The artifice of increasing the angular frequency $\omega'$ is to decrease the width of each signal electrode so that the work of fabricating electrodes is very difficult. Consequently, it is actually impossible to exclude the beat component of $\omega'$ and $\omega$ from the band of the video signal.

However, as described above, if the beam is defocused, the beat component is reduced. Namely, as a result of integrating effect in the formula (19), the response of the electron beam to the frequency $\omega'$ is lowered.

If the time $\Delta T$ during which the signal current flows coincides with one period of $\omega'$, then the response to 107' is zero. Namely, if the effective diameter of the electron beam is made larger than the width of one set of the signal electrodes *r*, *g* and *b* and the density of the beam current is appropriately determined, then the response to $\omega'$ can be reduced to zero.

The frequency component of $\omega$ is due to the phenomenon that no stream of electrons occur when $E_C < 0$ and the response to $\omega$ is not substantially lowered even if the beam is defocused. Therefore, by defocusing the electron beam, it is possible that only the above said phase shift should be caused with respect to $\omega$ and that the response to $\omega'$ should be lowered to prevent the generation of the beat component. According to the experiments by the inventors, when the beam is defocused to give a resolution of about 300 lines, such a beat component could not be detected at all.

Thus, it is proved that the variation in the phase of the $\omega$ component of the signal current with the intensity of the incident light, together with the beat component of $\omega$ and $\omega'$, can be reduced below a detectable limit.

Figure 9:
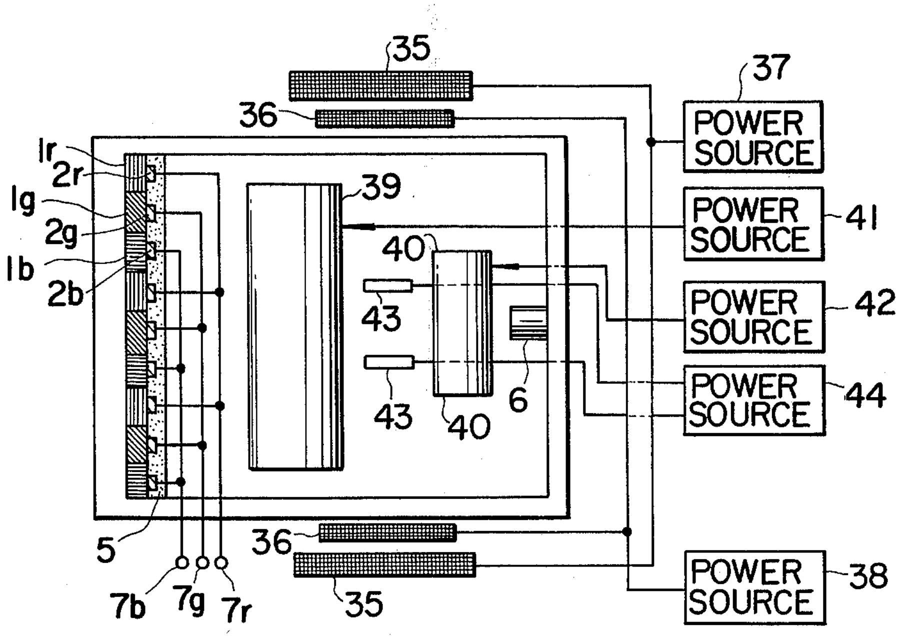
FIG. 9 show the schematic structure of an image pickup tube used in a color camera as one embodiment of the present invention.

FIG. 9 shows in cross section a magnetic deflection and focusing type SPT color camera embodying the present invention, which camera incorporates therein the above described means to increase the effective diameter of the electron beam and to defocus the beam by decreasing the density of the beam current. In FIG. 9, the parts designated by the same reference numerals and characters as in FIG. 1 are similar or equal to those in FIG. 1. Focusing coil 35 and deflecting coil 36 are disposed externally in the vicinity of the tube envelope and energized by current sources 37 and 38, respectively. A focusing electrode 39 having the form of a hollow cylinder is sealed in the tube envelope and an electron beam control electrode 40 in the form of a hollow cylinder is located between the focusing electrode 39 and the electron gun 6. A voltage source 41 supplies a voltage for the focusing electrode 39 while a voltage source 42 supplies a voltage for the beam control electrode 40. Beam oscillating electrodes 43 are located between the focusing electrode 39 and the beam control electrode 40 and a voltage source 44 serves to energize the beam oscillating electrode 43.

In the color camera having the structure as described just above, the electron beam can be defocused by appropriately changing the current supplied for the focusing coil 35. Namely, the current source 37 is controlled to supply a suitable current for the focusing coil 35.

Moreover, since the defocusing of the electron beam can be performed also by appropriately changing the voltage applied to the focusing electrode 39, the beam can be defocused by controlling the voltage source 41.

Further, for the purpose of defocusing the beam, an A.C. current of 10 MHz is also generated by the current source 38 and the 10 MHz current is superposed upon the current supplied for the deflecting coil 36 for the deflection of the beam so that the 10 MHz field (electric or magnetic) is superposed upon the deflecting field (electric or magnetic) to defocus the beam. The superposition of such a high frequency field upon the deflecting field can also be efected by the use of the beam oscillating electrode 43 to which a 10 MHz voltage is applied by the separate voltage source 44.

Next, the process of obtaining the NTSC or PAL signal from the image pickup tube used in the camera shown in FIG. 9, without the use of an encoder, will be described.

The NTSC signal $S_N$ is such that $$S_N = Y + I\cos(\omega_N t + 33°) + Q\sin(\omega_N t + 33°) \quad (23)$$

where Y is the luminance signal, $I$ and $Q$ the color difference signals and $\omega_N$ the color subcarrier frequency. Therefore, it follows that for R, G and B $$S_N = Y + 0.632\,R\sin(\omega_N t - 256.5°) + 0.593\,G\sin(\omega_N t - 119.5°) + 0.447\,B\sin(\omega_N t - 12.5°) \ \ldots.(24)$$

where $$\omega_N = 2\pi \times 3.58\ \text{MHz} \ \ldots\ldots\ldots\ldots \quad (25)$$

If, in this case, the phases of the voltages applied to the signal electrodes are suitably adjusted, $Q_j$ in the formula (22) can be determined such that $$Q_r = -256.5° \quad (26),$$
$$Q_g = -119.5° \quad (27) \quad \text{and}$$
$$Q_b = -12.5° \quad (28).$$

If it is, therefore, assumed that $$Y = \Delta\Phi_r + \Delta\Phi_g + \Delta\Phi_b \quad (29),$$
$$A_r = 0.632\ R \quad (30),$$
$$A_g = 0.593\ G \quad (31) \quad \text{and}$$
$$A_b = 0.477\ B \quad (32),$$

Then the NTSC $S_N$ given by the formula (24) coincides with the signal $I_S'$ given by the formula (22), except the factor $v$.

It is here necessary for $A_r$, $A_g$ and $A_b$ to increase with the increase in the incident lights R, G and B but not necessary for them to increase in proportion to R, G and B, as seen in the formulae (30), (31) and (32). As seen in FIG. 7, $A_j$ increases with $\Delta\phi_j$. And as seen in the formula (6), $\Delta\phi_j$ increases with the incident light R, G or B so that Aj is an increasing function of the incident light. On the other hand, since $$Y = 0.30\ R + 0.59\ G + 0.11\ B \ \ldots\ldots\ldots \quad (33)$$

the formula (29) is considered to approximately hold.

For a color camera, it is important to maintain the white banance constant, independent of the intensity of the incident light.

As seen in FIG. 7, $Aj$ is a function of $\Delta\phi_j/\Delta E_j$ and if a condition is set such that $$\frac{\Delta\Phi_r}{\Delta E_r} = \frac{\Delta\Phi_g}{\Delta E_g} = \frac{\Delta\Phi_b}{\Delta E_b} \quad (34)$$

then the changes of $A_r$, $A_g$ and $A_b$ corresponding to the changes of the levels $\Delta\phi_r$, $\Delta\phi_g$ and $\Delta\phi_b$ developed in the photoconductive layer due to the incident light, exhibit the same tendency.

When the intensity of the incident light is so high as to be represented by the inequality $\Delta\phi_j/\Delta E_j \geqq 2$, $A_j$ can be determined solely by $\Delta E_j$, as seen in FIG. 7. Therefore, if the amplitudes of the A.C. voltages applied to the signal electrodes are adjusted such that $$\frac{\Delta E_r}{0.632} = \frac{\Delta E_g}{0.593} = \frac{\Delta E_b}{0.447} \quad (35)$$

then it follows for the incident light having a high intensity that $$\frac{A_r}{0.632} = \frac{A_g}{0.593} = \frac{A_b}{0.447} \quad (36)$$

Moreover, by the conditions given by the formula (35) in addition to the formula (34) is satisfied the equations in the formula (36), independent of the intensity of the incident light and the white balance can be kept constant. Further, the coefficients of the $\omega$ components in the formulae (22) and (24) are equal to each other.

As described above, if the conditions given by the formulae (26) to (28) and (34) and (35) are all satisfied, the signal obtained from the image pickup tube coincides with the NTSC signal.

Figure 10:
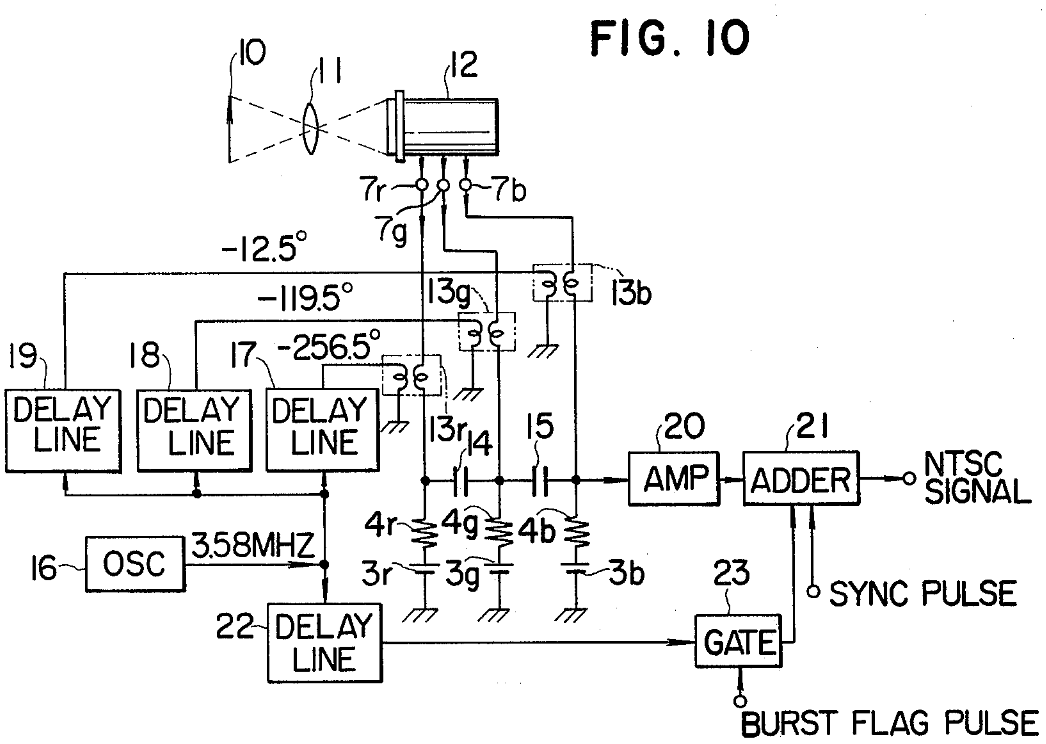
FIG. 10 shows the circuit configuration of a color camera to obtain an NTSC signal.

FIG. 10 schmatically shows a structure of such a color camera as can produce the NTSC signal. In FIG. 10, an image of an object 10 is formed on the face plate of an image pickup tube 12 by means of a lens 11. Signal output terminals 7*r*, 7*g* and 7*b* are connected with one ends of the secondary windings of transformers 13*r*, 13*g* and 13*b* and the other ends of the secondary windings of the transformers 13*r*, 13*g* and 13*b* are connected with series circuits of a resistor 4*r* and a D.C. source 3*r*, a resistor 4*g* and a D.C. source 3*g* and a resistor 4*b* and a D.C. source 3*b*. Capacitors 14 and 15 connect the resistor 4*r* with the resistor 4*g* and the resistor 4*g* with the resistor 4*b*.

An oscillator 16 delivers an output signal having a frequency of 3.58 MHz, which is passed through delay lines 17, 18 and 19 to produce such three signals as having phases given by the expressions (26) to (28). The three signals thus formed are applied to the primary windings of the transformers 13*r*, 13*g* and 13*b*. The signal currents through the resistors 4*r*, 4*g* and 4*b* which correspond to the signal currents $I_S'$ given by the formula (22), are amplified by an amplifier 20 and combined with color burst and sync pulse in an adder to produce the NTSC signal. The color burst can be obtained by phase-correcting the output of the oscillator 16 through a delay line 22 and then by passing the phase-corrected signal through a gate 23 which is opened in response to burst flag pulses. The phase correction by the delay line 22 is for compensating the delay in the phase of the signal through the amplifier etc.

In this case, there are three power sources 3r, 3g and 3b used, whereas only one power source 3 is used in the embodiment shown in FIG. 3. The provision of the three sources is necessary for the satisfaction of the conditions given by the formula (34). Namely, as seen from the formula (6), the sensitivity of $\Delta\phi_j$ to the intensity of the incident light varies with $E_{oj}$ so that the conditions of the formula (6) are satisfied by adjusting the D.C. power sources respectively. It is also seen from the formula (6) that the sensitivity of $\Delta\phi_j$ varies when $\Delta E_j$ is changed. However, since the value of $\Delta E_j$ is fixed according to the formula (35), it is more preferable to change $E_{oj}$ rather than $\Delta E_j$. Also, the sensitivity of $\Delta\phi_j$ can be controlled by changing either the permeability of each stripe filter element 1r, 1g or 1b as shown in FIG. 1 or the width of each signal electrode 2r, 2g or 2b. These last methods of controlling the sensitivity of $\Delta\phi_j$ are very complicated and the most recommendable one is to change $E_{oj}$. Thus, the NTSC signal can be obtained.

Next, the process of obtaining the PAL signal will be described. The PAL signal $S_p$ has such a form:

$$S_p = Y \pm I \cos(\omega_p t + 33°) + Q \sin(\omega_p t + 33°),$$

where $\omega_p$ represents the frequency of chrominance subcarrier. Here, the duplicate sign ± means that the plus and minus signs alternate every horizontal scanning period.

Moreover, if the $\omega_p$ components are developed by the use of R, G and B, the following equivalent expressions can be derived. When the sign before $I$ is positive, it follows as in the formula (24) that $$S_p = Y + 0.632\,R \sin(\omega_p t - 256.5°) + 0.593\,G \sin(\omega_p t - 119.5°) + 0.477\,B \sin(\omega_p t - 12.5°) \quad (37)$$

When, on the other hand, the sign is negative, the $\omega_p$ component is symmetric with the $\omega_p$ component of the formula (37) with respective to the Q axis. Accordingly, it follows that $$S_p = Y + 0.632\,R \sin(\omega_p t - 37.5°) + 0.593\,G \sin(\omega_p t - 174.5°) + 0.447\,B \sin(\omega_p t - 281.5°) \quad (38)$$

where $$\omega_p = 2\pi \times 4.43 \text{ MHz} \ldots\ldots \quad (39)$$

Figure 11:
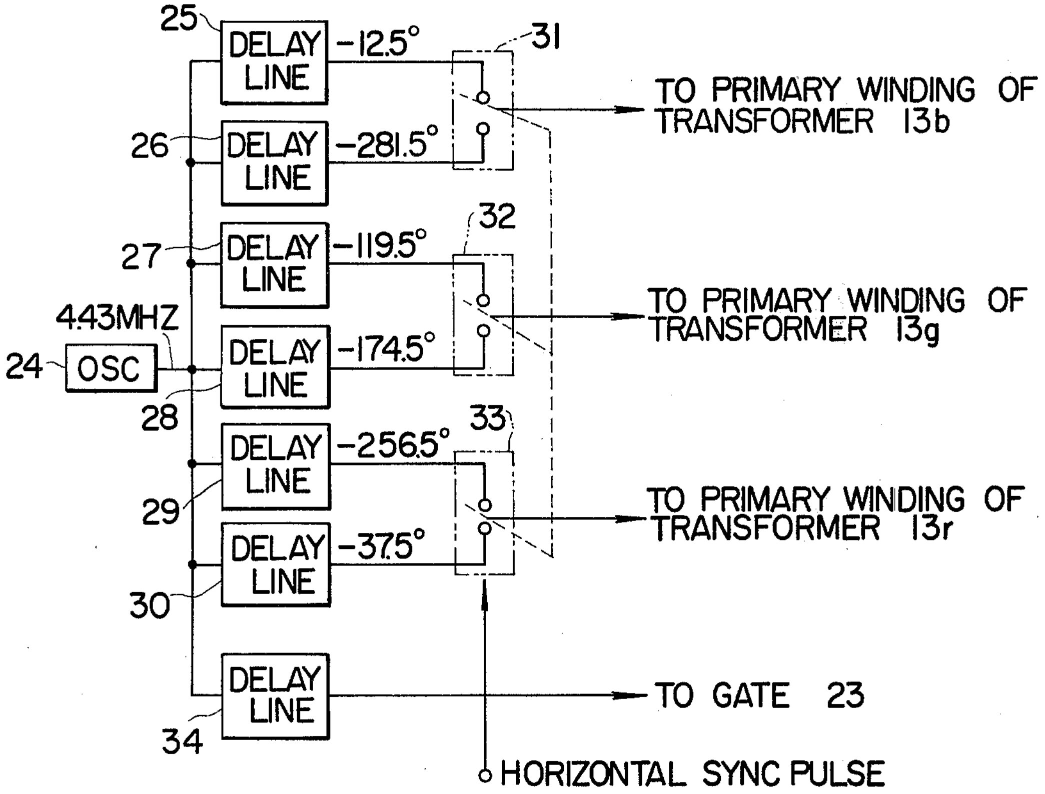
FIG. 11 shows a part of the circuit configuration of a color camera to obtain a PAL signal.

Therefore, the difference in circuitry of the color camera to obtain the PAL signal from the camera, shown in FIG. 10, to obtain the NTSC signal is the circuit portion shown in FIG. 11. Nemely, the output of an oscillator 24 whose oscillating frequency is 4.43 MHz is divided by means of delay lines 25 to 30 into six signals having phases of −256.5°, −37.5°, −119.5°, −174.5°, −12.5° and −281.5°. Each pair of them are switched over by one of switches 31, 32 and 33 so that the signal having a phase of −256.5° or −37.5° is applied to the transformer 13r, the signals having phases of −119.5° and −174.5° to the transformer 13g and the signals having the phases of −12.5° and −281.5° to the transformer 13b. All of the switches 31, 32 and 33 are simultaneously changed over every horizontal scanning period. And the output of the oscillator 24 is applied through a delay line 34 to the gate 23 to produce color burst. The other structure of the color camera to obtain the PAL signal is the same as that shown in FIG. 10. Thus, the PAL signal can be obtained.

In conclusion, the merits of the present invention are as follows.

1. The phase variation of the signal obtained from the image pickup tube, in response to the intensity of the incident light can be rendered less than detectable by appropriately controlling the effective diameter of the scanning electron beam and the density of the beam current so that color TV picture free from adverse color mixture can be obtained. Also, the undesirable beat component which will deteriorate the picture quality of the color TV signal, can be eliminated.

2. The color TV signal with excellent white balance can be easily obtained by appropriately adjusting the D.C. voltages applied to the respective signal electrodes.

3. The NTSC or PAL signal can be directly obtained without the use of an encoder by appropriately adjusting the amplitudes, frequencies and phases of the A.C. signals applied to the respective signal electrodes so that the size and weight of the color camera can be reduced.

We claim:

1. A single pickup tube color camera comprising a color filter consisting of three kinds of periodically disposed stripe filter elements; three kinds of transparent stripe signal electrodes disposed respectively on said three kinds of stripe filter elements; a photoelectric transducing layer in contact with said transparent signal electrode; beam generating means for emitting an electron beam to scan said photoelectric transducing layer; control means for controlling said electron beam; three kinds of signal terminals connected respectively with said three kinds of transparent stripe signal electrodes; means for applying to said signal terminals D.C. voltages and A.C. voltages having the same frequency but different phases; wherein the dot sequential signal corresponding to the three primary color images of the object is obtained from the currents derived at said signal terminals in response to the scanning by said electron beam, characterized in that said control means includes therein a means for defocusing said electron beam so as to increase the effective diameter of the beam spot on said photoelectric transducing layer.

2. A single pickup tube color camera as claimed in claim 1, wherein said means for defocusing said electron beam comprises means for focusing said electron beam and a current source for supplying a variable current for said focusing means.

3. A single pickup tube color camera as claimed in claim 1, wherein said means for defocusing said electron beam comprises an electrode for focusing said electron beam and a voltage source for supplying a variable voltage for said beam focusing electrode.

4. A single pickup tube color camera as claimed in claim 1, wherein said means for defocusing said electron beam comprises a beam deflecting means for deflecting said electron beam and a voltage source for supplying a deflection voltage with a high frequency voltage superposed thereupon for said beam deflecting means.

5. A single pickup tube color camera as claimed in claim 1, wherein said means for defocusing said electron beam comprises beam oscillating electrodes for oscillating said electron beam, which electrodes are provided along the path of said beam emitted from said beam generating means and in the vicinity of said electron beam, and a voltage source for supplying a voltage to said beam oscillating electrodes.

6. A single pickup tube color camera as claimed in claim 1, further including means for separately adjusting said D.C. voltages applied to said signal terminals so that the ratio of the variations in the potentials of the photoconductive layer corresponding to the red, green and blue light components is made equal to the ratio of the amplitudes of said A.C. voltages and the color distortion due to the change in the brightness of the object is prevented from occurring in said dot sequential signal.

7. A single pickup tube color camera as claimed in claim 1, wherein said color filter is permeable to red, green and blue lights or the complementary components thereof; the phases of said A.C. voltages are respectively −256.5°, −119.5° and −12.5°; said ratios of said potential variations and of said amplitudes are nearly equal to 0.632 : 0.593 : 0.477; and the frequency of said A.C. voltage is 3.58 MHz, so that said dot sequential signal coincides with said NTSC signal.

8. A single pickup tube color camera as claimed in claim 1, wherein said color filter is permeable to red, green and blue lights or the complementary components thereof; the phases of said A.C. voltages are switched over every horizontal scanning period so that said phases may be substantially equal to −286.5°, −119.5° and −12.5° on the scanning lines of even (or odd) order and to −37.5°, −174.5° and −281.5° on the scanning lines of odd (or even) order; said ratios of said potential variations and of said amplitudes are nearly equal to 0.632 : 0.593 : 0.477; and the frequency of said A.C. voltage is 4.43 MHz, so that said dot sequential signal coincides with the PAL signal.

* * * * *